United States Patent [19]

Baumann

[11] Patent Number: 4,811,719
[45] Date of Patent: Mar. 14, 1989

[54] FUEL PREHEATER

[75] Inventor: Dieter Baumann, Greven-Gimbte, Fed. Rep. of Germany

[73] Assignee: Ing. Walter Hengst GmbH & Co. KG, Muenster, Fed. Rep. of Germany

[21] Appl. No.: 41,717

[22] Filed: Apr. 23, 1987

[30] Foreign Application Priority Data

Sep. 4, 1986 [DE] Fed. Rep. of Germany ....... 3630084

[51] Int. Cl.⁴ ............................................. F03M 31/16
[52] U.S. Cl. ...................................... 123/557; 165/165
[58] Field of Search ................. 123/557, 547; 165/165, 165/51, 52

[56] References Cited

U.S. PATENT DOCUMENTS

| | | | |
|---|---|---|---|
| 3,399,708 | 9/1968 | Usher et al. | 165/165 |
| 4,383,499 | 5/1983 | Rackham et al. | 165/165 |
| 4,424,422 | 1/1984 | Bell et al. | 123/557 |
| 4,434,773 | 3/1984 | Granetzke | 123/557 |
| 4,454,851 | 6/1984 | Bourbonnaud et al. | 123/557 |
| 4,502,451 | 3/1985 | Duprez | 123/557 |
| 4,502,955 | 3/1985 | Schaupp | 123/557 |

Primary Examiner—Willis R. Wolfe
Assistant Examiner—M. Macy
Attorney, Agent, or Firm—Felfe & Lynch

[57] ABSTRACT

The invention relates to a fuel preheater, especially for use in diesel engines of motor vehicles, in which the fuel, as a first fluid medium, is heated by absorbing heat from a second fluid medium of higher temperature, and in which the two media are carried through the preheater in separate passages. The preheater has a core which consists substantially of a set of walls of meandering cross section which forms two groups of parallel passages opening alternately on one longitudinal side and the other longitudinal side and running between the individual walls of the set the passages of one group being all open on the same side. The core is disposed between two covers covering the open longitudinal sides of the passages. In the core and/or in at least one of the covers there are disposed, for each of the two media, a distributor passage connecting together the passages of one group at the end side to an inlet from the outside and a collecting passage with an outlet to the outside, plus, at least one a portion of the walls of the core, ribs running substantially perpendicular to the direction of flow of the particular medium and projecting into the interior of the passages.

4 Claims, 6 Drawing Sheets

FUEL PREHEATER

BACKGROUND OF THE INVENTION

The invention relates to a fuel preheater, especially for use in diesel engines of motor vehicles, in which the fuel as the first fluid medium is warmed by absorbing heat from a second fluid medium of higher temperature, and in which the two media are carried through the preheater in separate passages.

Fuel preheaters of the above-described kind are known and serve especially to prevent the segregation of paraffin crystals from diesel fuel at low temperatures by heating the fuel preferably by thermal energy originating from the cooling water circuit. Known preheaters have a number of disadvantages, which are encountered singly and sometimes also in combination. The following disadvantages in particular are to be mentioned: bulky construction and therefore more difficult installation where little space is available in a motor chamber, danger of the two media becoming mixed in the case of leakage, complex construction involving a large number of parts and hence high manufacturing costs, heavy weight, and inefficient thermal design resulting in low efficiency.

The problem therefore presents itself of creating a fuel preheater of the kind described above, which will avoid the described disadvantages, will be compact, light and reliable in operation, will have a high efficiency, and will be economical to manufacture and install.

SUMMARY OF THE INVENTION

The problem is solved according to the invention by a fuel preheater of the kind described, wherein The preheater has a core which consists substantially of a set of walls which has a meandering cross section and which forms two groups of parallel passages opening alternately on one longitudinal side and the other longitudinal side and running between the individual walls of the set, the passages of one group being all open on the same side, The core is disposed between two covers placed over the open longitudinal sides of the passages, In the core and/or in at least one of the covers there are disposed, for each of the two media, a distributing passage connecting together the passages of one group at the end side to an inlet from the outside and a collecting passage connecting them to an outlet to the outside, and in which at least on a portion of the walls of the core, ribs running substantially perpendicular to the direction of flow of the particular medium and projecting into the interior of the passages are disposed.

The preheater according to the invention thus consists of only three individual parts, which can be fastened together in a simple manner, e.g., by means of screws with the interposition of gaskets. This simplifies and reduces the cost of the manufacture and assembly of the preheater. The meandering set of walls brings it about that, in the event of leakage at the points where the individual parts are joined, the media—generally diesel fuel and cooling water—are able to escape to the outside, but not to enter the passages containing the other medium. Any harmful mixing of the two media is thus impossible. Since the passages for the two media run parallel to one another, the preheater can operate in a genuine countercurrent with a high degree of efficiency, while efficiency-reducing crossflow or laminar flow does not occur. The ribs which are disposed on the walls of the passages and which provide for a thorough turbulence in the media flowing through them and thus for an effective transport of heat, contribute to a high efficiency. Since all of the necessary fittings, such as inlets, outlets, distributor passages and collector passages are integrated in the core and/or in the covers or in one of the covers, the preheater is of very compact configuration and free of externally disposed, troublesome conduits and passages for the said fittings.

A very especially compact form of the preheater is achieved by disposing the passages to run together parallel in a U-shaped configuration in the core, and by having all passages terminate substantially in one common end plane. All necessary connections are thus situated at one end of the preheater and can run together, for example, from there. In principle, this construction of the preheater is obtained, visually speaking, by "bending toward one another" the ends of an elongated preheater with rectilinear passages. Which construction of the preheater is used is up to the judgment of the person skilled in the art and is governed by the conditions on hand, such as the installation situation in an engine room or motor compartment.

The preheater becomes especially desirable in construction and in efficiency if at least the core consists of aluminum or an aluminum alloy and is made by the pressure casting method. Not only the central portion but, of course, the covers as well can be made of aluminum die castings. The pressure casting process produces the parts in any case at very attractive cost and calls for only a few manual operations. Furthermore, parts made of aluminum alloys are of low weight and are corrosion resistant, in addition to having a high thermal conductivity. On account of the special configuration of the parts of the preheater as described, especially of the core, production by pressure casting methods can be achieved without problems, since all parts can be parted from the molds, only two mold stripping directions antiparallel to one another are necessary in the case of the core. Thus the casting dies can be kept relatively simple, which contributes to the economical manufacture of the preheater. At the same time, in this type of manufacture, it is very simple to make the ribs in one piece with the walls, since the ribs are oriented in the mold-separating direction.

Since fuel needs to be preheated only at low atmospheric temperatures, a thermostat regulating the fuel flow is generally provided in fuel preheaters. To retain the compact structure of the preheater according to the invention, the fuel inlet and outlet as well as a thermostatic valve (which is to conduct the fuel according to its temperature on entry, partially or entirely through the passages in the core and/or partially or completely through a by-pass disposed in the cover or in the core), are disposed in one of the two covers or in the core. Thus no separate housing is required for the valve and no additional assembly and connection work has to be done when the preheater is installed.

Another component of conventional fuel preheaters is a separate fuel filter. In order to eliminate the need for a separate component in this case too, a fuel filter is integrated into one of the covers or into the core, through which filter the fuel will flow independently of the position of the thermostatic valve. This measure additionally contributes to increasing the compactness and to the reduction of the amount of material required and of the time required for assembly. It is desirable to provide for the filter to have a replaceable cartridge which can be removed through an opening in the preheater which can be tightly closed.

Since the fuel preheater is able to yield heat to the fuel only after a certain amount of engine running time—a few minutes in practice—perturbances in the operation of the engine in the warm-up phase can occur under unfavorable circumstances. It is true that fuel filters do not clog up with paraffin crystals abruptly, but only after a period of time at low temperatures, but it is advantageous to take the precaution of providing in the core or in one of the covers at least one electrically powered heating element over or through which the entering fuel flows. Preferably in the warm-up phase this provides so that, even if the cooling water is still cold, the fuel will be heated, so that the above-mentioned perturbances of operation will be securely prevented. Since this element too is integrated into the preheater, only a small amount of additional parts and installation work is called for.

With the invention, therefore, a fuel preheater is made available which is compact, inexpensive and effective, and which combines in itself all of the parts and characteristics necessary for a reliable and safe operation.

Preferred embodiments of the invention will be explained hereinbelow in conjunction with the drawing, wherein.

Figure 1:
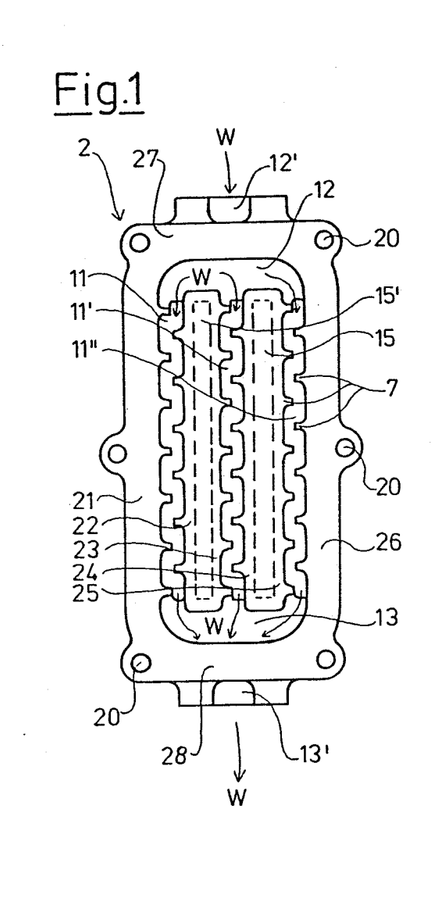
FIG. 1 is a front elevation of the one flat side ("water side") of the preheater in a first embodiment with the cover removed.
Figure 2:
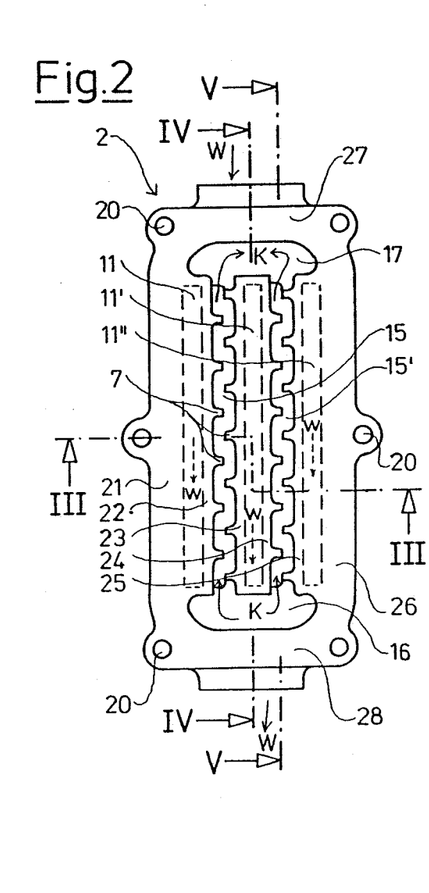
FIG. 2 is again a front elevation of the second flat side ("fuel side") of the preheater from FIG. 1, also with the cover removed.
Figure 3:
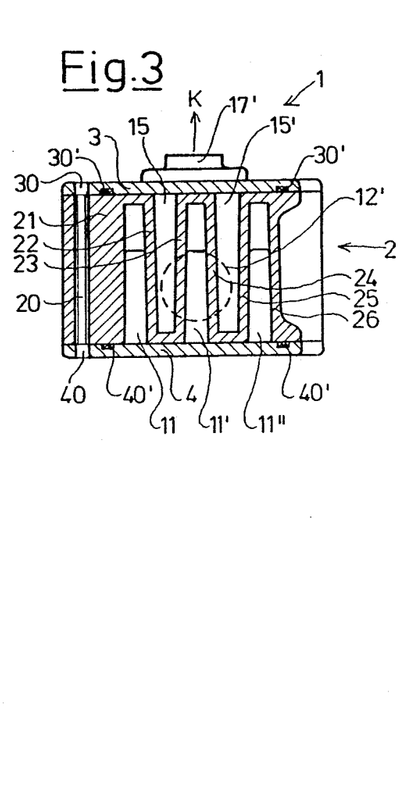
FIG. 3 is a cross section taken along line III—III of FIG. 2 of the preheater according to FIGS. 1 and 2, with the covers installed.

As it can be seen by consulting FIGS. 1-3 of the drawing, the first embodiment of the fuel preheater according to the invention has a substantially parallelipipedal configuration. A core 2 is covered top and bottom by a cover 3 and 4, respectively. As best seen in FIG. 3, the core 2 is formed substantially of a meandering set of walls 21-26. Between the walls 21-26, two sets of passages are thus formed, one of which is composed of passages 11, 11' and 11" and the other of passages 15 and 15'. As it can be seen in FIG. 3 as well as in FIGS. 1 and 2, if the covers 3 and 4 are removed from the core 2, the passages 11, 11' and 11" as well as 15 and 15' will be open, one on each of the flat sides of the preheater 1. In the core 2 as represented in FIG. 1, therefore, the viewer is looking into the passages 11, 11' and 11", while in the case of FIG. 2, showing the other flat side of the core 2, the viewer is looking into the passages 15 and 15'.

The passages referred to serve to carry two fluid media, in this case water W from the cooling water circuit of an internal combustion engine, and fuel K for the engine in question. As it will be seen from a comparison of FIGS. 1 and 2, the water W and fuel K flow in opposite directions through the core 2 of the preheater 1. The water W, which comes heated from an engine which is not represented, comes through an inlet 12' into a distributing passage 12 present in the core 2, which is disposed at one end of the passages 11, 11' and 11" and connects them to one another. After passing through the passages 11, 11' and 11", the water runs into a distributing passage 13 disposed at the other end of the passages and from there through an outlet 13' back to the engine cooling circuit. In the passages 11, 11' and 11" which run parallel to one another longitudinally through the core 2, ribs 7 are disposed which are integral with the walls 21-26 and project into the said passages. These ribs provide for an intense agitation of the flowing water and thus prevent any laminar flow that impairs the transfer of heat. The core 2 is terminated at each end by the end walls 27 and 28, respectively, which are integral therewith, the two end walls in this embodiment containing the inlet 12' as well as the outlet 13' for the water. The edge of the end walls 27 and 28 and outer longitudinal walls 21 and 26 is planar all around and serves for the mounting of the cover 4, as shown in FIG. 3. To fasten the core 2 and cover 4 together, taps 20 are provided in the core, into which screws passed through bores 40 in cover 4 can be driven. To prevent the escape of water from the passages 11, 11' and 11", sealing means 40' are provided between the outer longitudinal walls 21 and 26 on the one hand and the cover 4 on the other. Additional seals on cover 4 are unnecessary, since water can pass only from the one passage into another water-carrying passage. Any mixing of the two media is thereby made impossible. The opposite side of the preheater 1 is of similar construction. Here the cover 3 can be fastened to the core 2, with the interposition of sealing means 30', by means of screws inserted through openings 30. Also visible in FIG. 3 is an outlet connection 17' for the fuel, mounted on the cover 3, and communicating with the outlet collecting passage 17 (see FIG. 2). Lastly, the location of the inlet 12' for water is indicated by a broken circle in FIG. 3.

Figure 4:
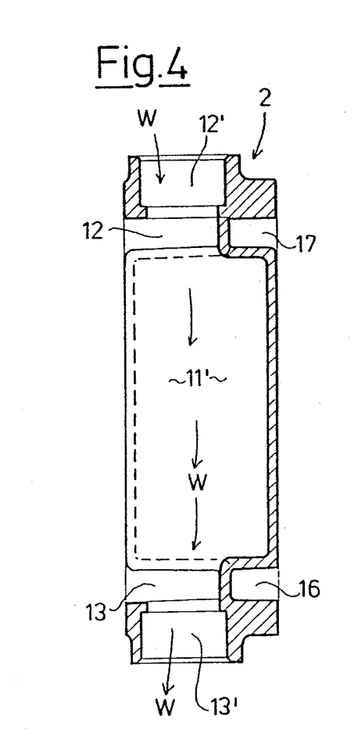
FIG. 4 is a longitudinal cross section along line IV—IV of FIG. 2, of the preheater of FIGS. 1-3.
Figure 5:
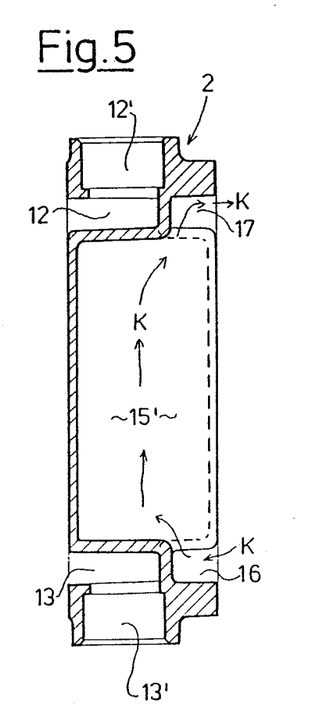
FIG. 5 is another longitudinal cross section, here taken along line V—V of FIG. 2, of the preheater of FIGS. 1-4.

FIGS. 4 and 5 show two longitudinal sections through the core 2 of the preheater 1, which show especially the location of the collecting and distributing passages and their connection to the passages carrying the two media. The section represented in FIG. 4 is taken through one of the passages for water, namely passage 11', while the section in FIG. 5 is taken through a passage for the fuel, namely the passage 15'. As already described above, and as can be seen especially in FIG. 4, the water W passes through the inlet 12' into the distributing passage 12, from which it is distributed to the water-bearing passages, including passage 11'. After flowing through the passages, again including passage 11', the water enters into the collecting passage 13 from which it flows through the outlet 13'. The location of the core 2 in FIG. 4 is in this case such that the "waterside" cover 4 is to be disposed on the left side as seen in the figure, while the "fuel-side" cover 3 is to be on the opposite side, i.e., on the right side as seen in the figure. This arrangement of the covers is applicable also to the representation in FIG. 5, which shows the path of the fuel K in a similar manner. After flowing into the distributing passage 16 the fuel flows through the fuel-carrying passages 15 and 15' (15' visible here) into the collecting passage 17 and flows out from there. The entering heated water W yields its heat, or at least a part of its heat, to the fuel flowing in the opposite direction, also through the core 2, so that the fuel is thus preheated in the desired manner. As it can be seen in FIGS. 4 and 5, the passages for the water and the passages for the fuel are separated from one another by continuous walls. Delicate and hard-to-manufacture gasketed joints are not necessary in the preheater according to the invention for keeping fuel and water apart.

Figure 6:
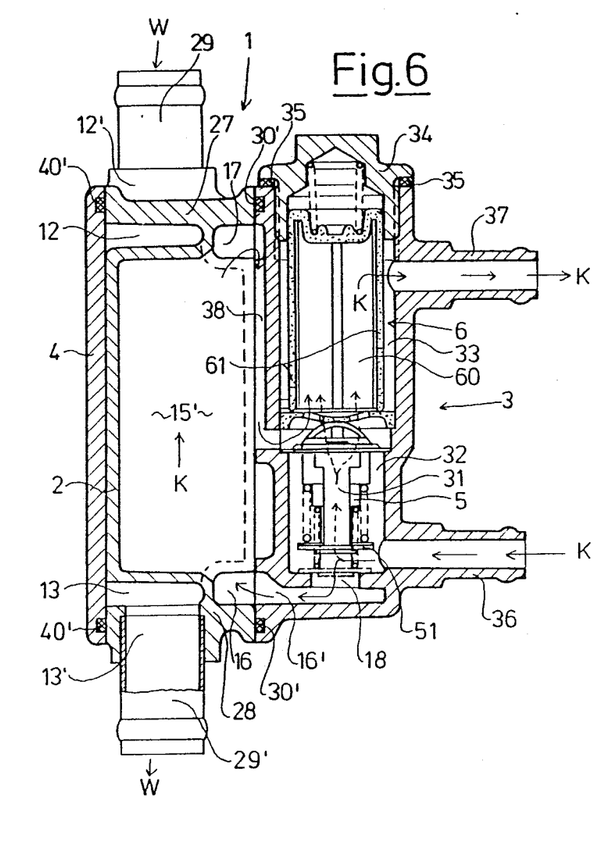
FIG. 6 is a longitudinal section of the preheater in an embodiment equipped with a thermostatic valve and fuel filter integrated into one of the covers.

While in FIGS. 1–5 there is shown a relatively simple embodiment of the preheater 1, FIG. 6 shows an embodiment of the invention in which a thermostatic valve 5 and a fuel filter 6 are also integrated into the preheater 1. The representation in FIG. 6 is a section taken longitudinally through the fuel passage 15', the same as in FIG. 5. The core 2 in this embodiment of the preheater 1 is constructed substantially the same as the first embodiment described hereinabove. On the "water side," i.e., on the left in the drawing, the core 2 is closed by the cover 4 with the interposition of sealing means 40', the same as in the case of the preheater of the first embodiment. At the ends, the core 1 additionally has an inlet connection 29 and an outlet connection 29' to which hoses can be connected for the input and outlet of water.

The previously mentioned thermostatic valve 5 as well as the fuel filter 6 are in this embodiment integrated into the "fuel-side" cover 3. The cold fuel K passes through an inlet connection 36 in the bottom right part of the drawing into a valve chamber 32. Centrally in this chamber there is disposed the thermostatic valve 5 which displaces a valve plate 51 according to the temperature of the entering fuel. In the case of cold fuel K, i.e., when the valve plate 51 is in the position indicated by solid lines in FIG. 6, an overflow opening 18 is released, through which the fuel passes from the valve chamber 32 into the inlet 16' and on into the distributing passage 16. From there the fuel is distributed, as already explained, to the passages 15 and 15' from which it passes into the collecting passage 17 at the other end of passages 15 and 15'. From there the fuel does not flow directly away, as in the first embodiment, but is carried through a passage 38 to the inlet side of the fuel filter 6, or, more precisely, into the inner chamber 60 of the filter. After flowing through a layer of filter paper or filter fabric 61, the fuel runs into a filter chamber 33 surrounding the fuel filter 6 and finally flows from there through the outlet connection 37.

If the fuel flowing through the inlet connection 36 already has a sufficiently high temperature, the valve plate 51 assumes the position represented in broken lines in FIG. 4, i.e., it closes the overflow opening 18. In this position a bypass 31 running through the interior of the thermostatic valve 5 is simultaneously opened. The bypass 31 carries the fuel directly into the inner chamber 60 of the fuel filter 6, out of which it flows through the filter paper layer 61 and out through the outlet connection 37, as described. Flow through the passages 15 and 15' resulting in absorption of heat from the cooling water flowing in the other passages is thus prevented. In addition to the two extreme positions which have here been described, the valve plate 51 can also assume intermediate positions, in which case a portion of the fuel then flows through the core 2 while a portion of the fuel flows directly to the fuel filter 6 and then to the outlet connection 37.

In this embodiment too, the core 2 and the cover 3 are fastened sealingly together with the interposition of sealing means 30'. The filter paper or filter fabric layer 61 here has the form of a cylindrical filter body which can be removed or replaced after opening the filter chamber closure 34. To prevent the escape of fuel, the filter chamber closure 34 has a gasket 35 underneath it.

Figure 7:
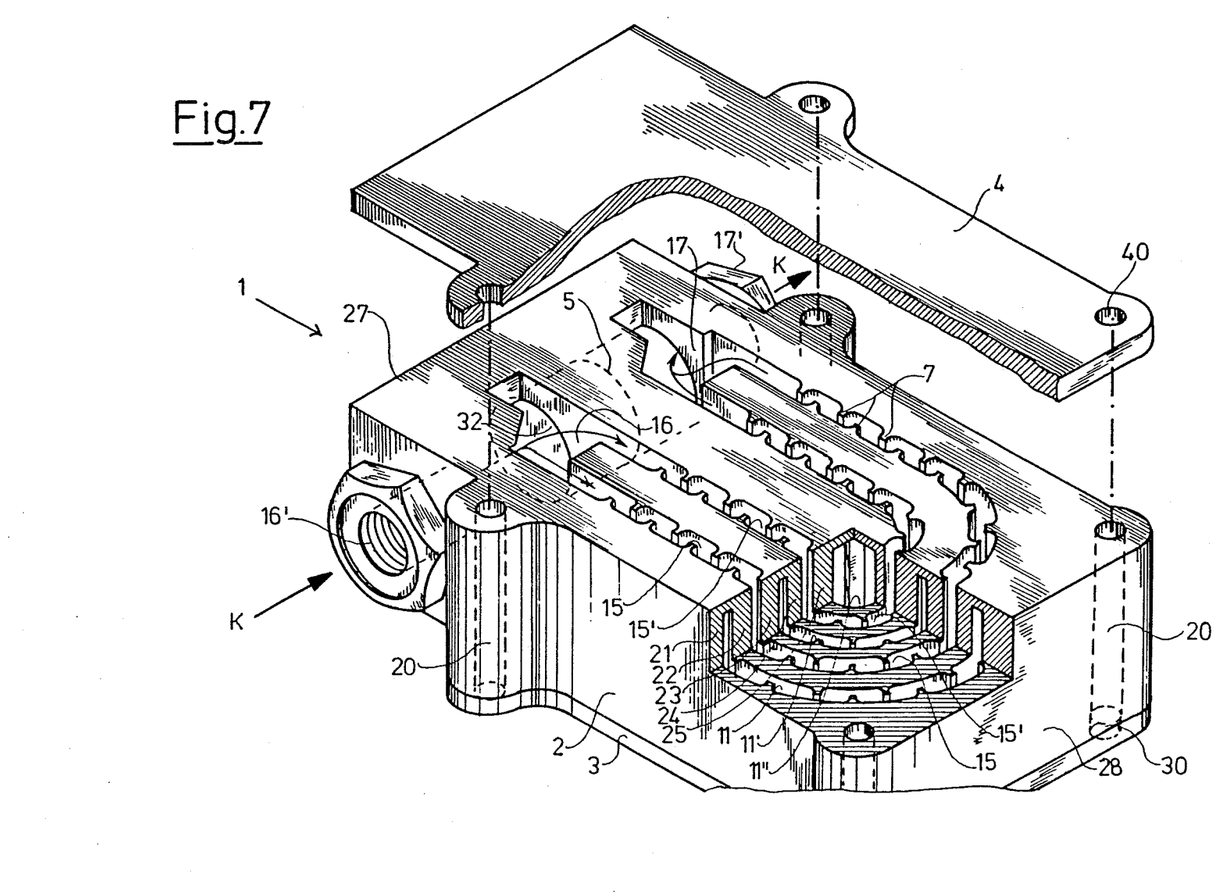
FIG. 7 is a perspective view, partially cut away, of the preheater in a third embodiment, with one cover raised.

FIG. 7 is a perspective view of a third embodiment of the fuel preheater 1 according to the invention. The "fuel-side" cover 4 is in this representation raised so as to permit viewing the arrangement of the passages 11, 11' and 11" as well as 15 and 15'. Also, a portion of the center part 2 is shown cut away.

As it can be seen in FIG. 7, the passages 11, 11' and 11" for the water and the passages 15 and 15' for the fuel are in a U-shaped arrangement. In spite of this modified configuration of the passages, however, the basic construction of the core 2 with the meandering set of walls 21–26 is retained. The difference is only that the arrangement of the set of walls 21–26 is repeated symmetrically about a vertical plane of symmetry running longitudinally through the core. Thus the embodiment of the core 2 that is here represented is substantially the same as the first embodiment shown in FIGS. 1–5, the core 2 being bent to a U-shape with a merging of the walls folded against one another to form a center wall 26. The end 28 of the core 2 now is located at the bend of the passages and end 27 is located at the inlet and outlet of the two media. Of these, the inlet 16' and the outlet 17' for the fuel K can be seen in the elevation according to FIG. 7. In the represented embodiment, they are disposed directly adjacent the end 27 in the opposite lateral surfaces of the core. In this part of the core 2, between inlet 16' and outlet 17', there is disposed a thermostatic valve 5 adapted to this embodiment of the fuel preheater. This valve regulates the flow of the fuel from the inlet 16' into the distributing passage 16, from where the fuel is distributed to the passages 15 and 15'. After that the fuel runs into the collecting passage 17 directly adjacent the distributing passage 16 and from there to the above-mentioned outlet 17'. The water that yields heat to the fuel flows through the passages 11, 11' and 11" parallel to the fuel, but in the opposite direction.

If the fuel is not to be further heated, the valve 5 opens a bypass 32 which connects the inlet 16' directly to the outlet 17', while at the same time the overflow opening 18 is closed.

The cover 4 is attached, as already described, by means of screws passed through bores 40 into taps 20 in the core 2. The bottom cover 3, i.e., the "water-side" cover, can be fastened to the core 2 by screws passed through bores 30.

FIG. 8 again shows a view of the "fuel side" of the core 2 in the embodiment according to FIG. 7. Here again can be seen the U-shaped configuration of the passages 11, 11' and 11" as well as 15 and 15' between the walls 21-26. Again, the ribs 7 projecting into the passages can be seen.

Figure 8:
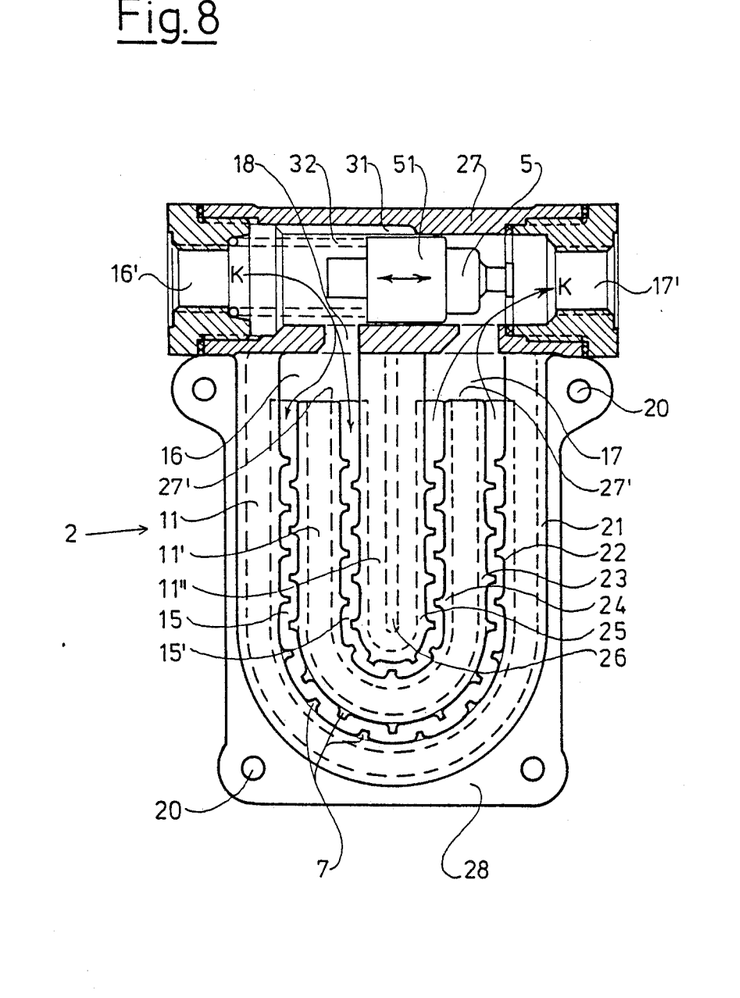
FIG. 8 is a top plan view of the one flat side ("fuel side") of the preheater of FIG. 7, partially in cross section, with the cover removed.

The portion of the core 2, which contains the thermostatic valve 5, is here shown in cross section so as to clarify the manner of operation of the valve 5 used in this case. In the position of valve 5 that is shown, an axially displaceable valve body 51 releases the overflow opening 18 from the fuel inlet 16' to the distributing passage 16. When the inflowing fuel is at a higher temperature, the valve body 51 moves leftward so that it closes the overflow opening 18 and releases the bypass 31 which connects the inlet 16' and the outlet 17'. The valve chamber 32 serving to contain the valve, and the valve 5 itself, are accessible by unscrewing the connection fitting which is screwed into the core 2 in the area of the inlet 16' and outlet 17'.

Lastly, it will once again be pointed out that all passages, both those for the water and those for the fuel, begin and end in the same plane 27'. Thus it is that all of the connections necessary for the operation of the preheater can be disposed at one end, namely in the area of the end wall 27. The end wall 28 is thus entirely free of any lines in or lines out.

Figure 9:
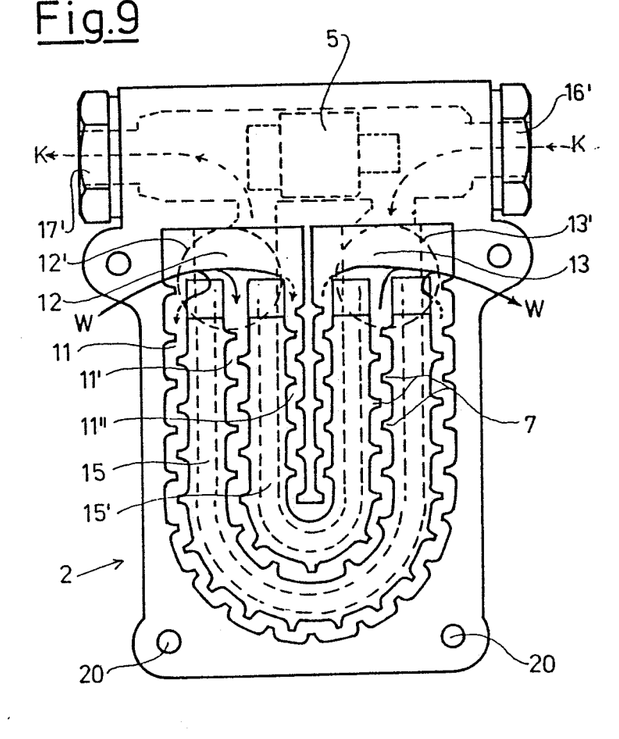
FIG. 9 is a plan view of the preheater of FIGS. 7 and 8 showing the other flat side ("water side") with the cover set off to one side.

FIG. 9 shows the core of the embodiment represented in FIGS. 7 and 8, as seen from the "water side." Here the U-shaped configuration of the water-bearing passages 11, 11' and 11" can be seen, and also, as indicated by the broken lines, the configuration of the fuel passages 15 and 15'. The ribs 7 are present in this case too. While the fuel K, as described, passes through the inlet 16' into the core 2 and leaves the latter again through the outlet 17', the water W flows from above through the inlet 12' into the distributing passage 12 and is distributed from there to the passages 11, 11' and 11". After flowing through the latter the water comes into the collecting passage 13 which is directly adjacent to the distributing passage 12, as in the case of the fuel.

The configuration of the "water-side" cover 3 in this embodiment can be seen in the right half of FIG. 9. Here the cover is represented as shifted laterally from the core 2. Above the distribution passage 12 and manifold 13, an inlet 12' and an outlet 13' are formed by an inlet connection 39 and an outlet connection 39', respectively, for corresponding water hoses. The direction of flow of the water is here again identified by arrows and by the letter W. Also visible are the bores 30 on the cover 3, which match the taps 20 on the core 2, and serve to accommodate the fastening screws.

Figure 10:
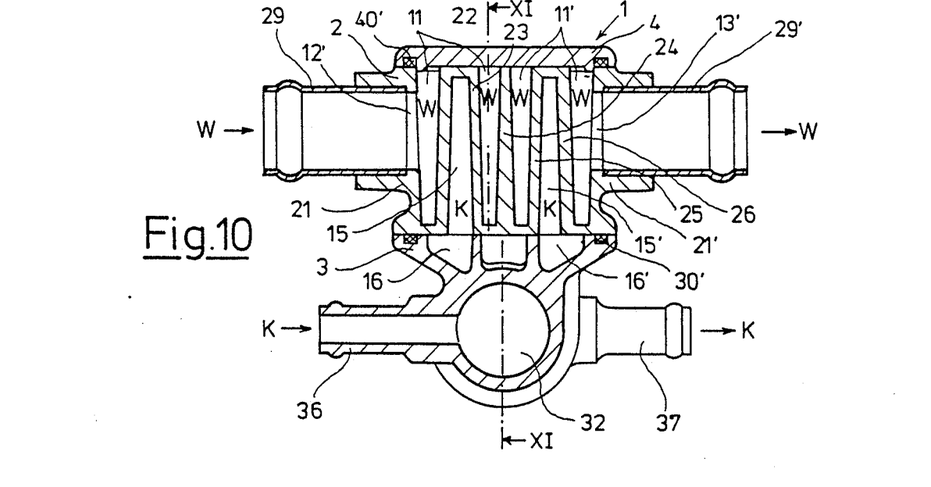
FIG. 10 is a cross section of the preheater in a fourth embodiment.

FIG. 10 of the drawing shows in cross section a preheater 1 in a fourth embodiment. As in the embodiment according to FIG. 6, this embodiment of the preheater 1 also consists of a core 2, a "fuel-side" cover 3 with a valve and a filter, and a second, "water-side" cover 4. Here, again, the core 2 is formed of a set of walls running substantially in a meandering pattern, and consisting of walls 21, 22, 23, 24, 25, 26 and 21'. Unlike the embodiments previously described, here the core 2 is symmetrical with a center wall 24. As a result there are a total of four water-bearing passages 11 and 11', and two fuel-bearing passages 15 and 15' situated each between two water-bearing passages 11 and 11', respectively. Another difference with respect to the embodiments described above is that the water inlet 12' and outlet 13' and the corresponding nipples 29 and 29', are disposed, not in the area of the end walls of the core 2, but terminally in its outer walls 21 and 21'. By this change in the location of the nipples 29 and 29' a substantially shorter overall length of the preheater 1 is achieved, so that it can be installed where there is less space available. As in all of the embodiments, in this one too the water-bearing passages 11 and 11' are open at their one longitudinal side, i.e., in this case toward the cover 4 and the fuel-bearing passages 15 and 15' are open on their longitudinal side facing the cover 3. Consequently a mixing of fuel and water cannot occur, either, in the preheater according to FIG. 10. To prevent a loss of water or fuel from the interior of the preheater 1, gaskets 40' and 30' are disposed between the latter and the cover 4 and 3, respectively.

The directions of the flow of water W and fuel K are indicated by the arrows in FIG. 10. The heated water W flows through the hose nipple 29 and the inlet 12' into the two water-carrying passages 11 running parallel to one another. Through the latter the water flows in two parallel streams to the opposite end of the core 2 where it is reversed and carried in the opposite direction into the passages 11'. After flowing through the latter the water W flows out of the preheater 1 through the outlet 13' and the corresponding outlet hose nipple 29'.

Figure 11:
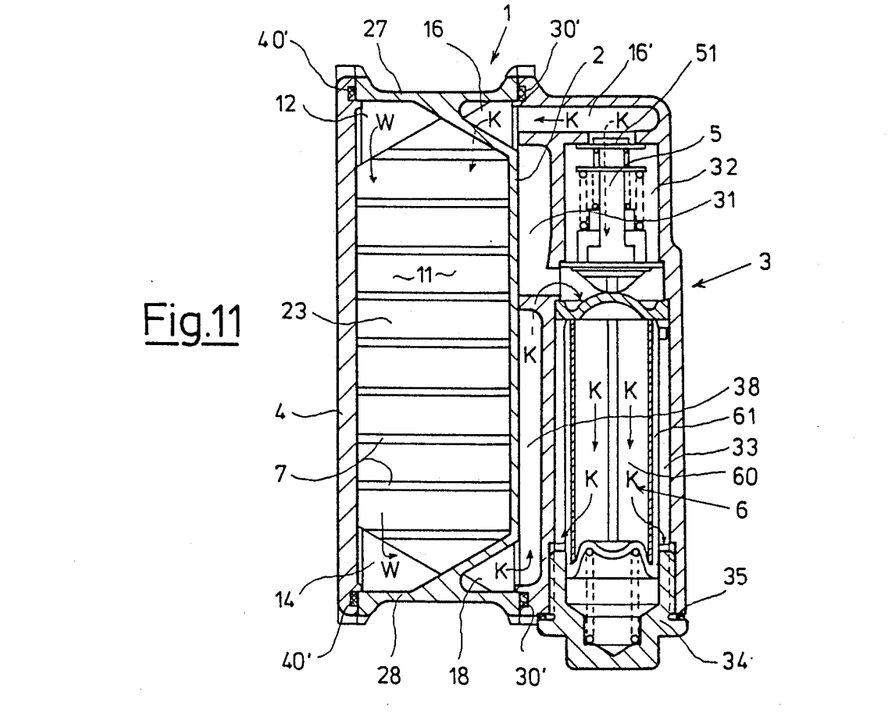
FIG. 11 shows the preheater from FIG. 10 in a longitudinal section along line XI—XI of FIG. 10.

The cold fuel K which is to be preheated flows through an inlet hose nipple 36 on the cover 3 and first into a valve chamber 32; from there, if the valve is in the proper position, as it will become clearer in conjunction with FIG. 11, it will flow first into a bipartite inlet 16', from which it will run in a parallel flow into the fuel-carrying passages 15 and 15'. After flowing through the latter the fuel K will pass at the other end of the preheater 1 back into the cover 3 and from there out of the preheater 1 through the outlet hose nipple 37.

Lastly, FIG. 11 shows the preheater 1 according to FIG. 10 in a longitudinal cross section along line XI—XI of FIG. 10. FIG. 11 therefore presents a representation of the preheater 1 similar to that of FIG. 6, although in FIG. 11 the plane of section runs through one of the water-carrying passages 11. Also shown in FIG. 11 is the way in which the preheater 1 is composed of a core 2, a "fuel-side" cover 3 and a "water-side" cover 4. Between these parts the gaskets 30' and 40' are again provided. In the viewing direction selected for the section XI—XI, the eye sees the wall 23 of the meandering set of walls defining the water-carrying passage 11. At the ends, the core 2 is defined by the end walls 27 and 28. In the area of the upper end wall 27 in the figure there can be seen a distributing passage 12 forming part of the inlet 12' for the water. Adjacent the latter there is disposed a fuel distributing passage 16 forming part of the inlet 16'. At the opposite end, i.e., at the bottom in FIG. 11, an overflow or turnabout passage 14 for the water. Also at that location is a manifold passage 18 for the fuel.

The thermostatic valve 5 and the fuel filter 6 are disposed in the cover 3, as already mentioned. In the valve chamber 32 can be seen a valve plate 51 of the valve 5 which moves in relation to the temperature, and which is represented at its two end positions.

The fuel filter 6 is identical in its construction to the filter in FIG. 6. Here, again, a layer of filter paper 61 of cylindrical shape is contained in a filter chamber 33.

As already explained in the description of FIG. 10, the water W flows from the distributing passage 12 through the water-carrying passages 11, being given a high turbulence by the ribs 7 running across the direction of flow. After passing through the passages 11 the water W is passed through the overflow or turnabout passage 14 into the water passages 11' which are not visible in this FIG. 11. After flowing through the latter the water passes back out of the preheater.

The fuel flowing into the cover 3 through the hose nipple 36 first passes into the inlet 16'. From here the fuel flows, depending on the position of the plate 51 of the thermostatic valve 5, either into the distributing passage 6 in the core 2, or through the thermostatic valve 5 directly into the fuel filter 6. When the valve 5 is in the closed position, i.e., when the valve plate 51 engages the wall of the cover 3 defining the inlet 16', the fuel flows through the distributing passage 16 and the fuel-carrying passages 15 and 15' connected therewith, to the outlet passage or transition 18. From there the fuel flows through a passage 38 to the fuel filter 6, or more precisely into the inner chamber 60 of the latter. From there, after passing through the layer of filter paper 61, the fuel reaches the filter chamber 33 and from there exits the preheater 1 through the outlet hose nipple 37 not seen in FIG. 11.

As in the embodiment of the preheater 1 shown in FIG. 6, in this embodiment too, to permit replacement of the fuel filter 6, the filter chamber 33 can be closed by screwing in the threaded stopper 34 with the interposed gasket 35.

The above-described various embodiments of the invention show that, with the invention, the manufacture of different fuel preheaters flexibly adapted to particular installations is possible. All of these embodiments, to which others can be added, are characterized by a high efficiency and by a very compact structure.

I claim:

1. Fuel preheater, especially for use in diesel engines of motor vehicles, in which the fuel as first fluid medium is heated by absorption of heat from a second fluid medium of higher temperature, and in which the two media are carried through the preheater in separate passages, comprising:

a core which has a set of walls of meandering cross section which forms two groups of parallel passages opening alternately on one longitudinal side and the other longitudinal side and running between the individual walls of the set, the passages of one group being all open on the same side, two covers with the core disposed therebetween and covering the open longitudinal sides of the passages, an inlet from the outside, in at least one of the core and the covers a distributor passage for each of the two media, connecting together the passages of one group at an end side to said inlet form the outside, and a collecting passage having an outlet to the outside, at least on a portion of the walls, core ribs running substantially perpendicular to the direction of flow of the particular medium and projecting into the interior of the passages, the ribs being of smaller length than the width of the passages, the core being made of at least one of pressure-cast aluminum and an aluminum alloy, and, in at least one of the two covers and the core, a fuel inlet and a fuel outlet and a bypass and a thermostatic valve conducting the fuel according to its entry temperature at least partially through said bypass.

2. Preheater according to claim 1, in which said two groups of passages in the case are disposed parallel to one another in a U-shaped configuration and terminate substantially in a common plane.

3. Preheater according to claim 1, which includes integrated into at least one of the covers and the core a fuel filer through which fuel flows independently of the position of the thermostatic valve.

4. Preheater according to claim 1, which includes in at least one of the core and the covers at least one electrically operated heating element disposed in the path of flowing fuel.

* * * * *

UNITED STATES PATENT AND TRADEMARK OFFICE
CERTIFICATE OF CORRECTION

PATENT NO. : 4,811,719

DATED : March 14, 1989

INVENTOR(S) : Dieter Baumann

It is certified that error appears in the above-identified patent and that said Letters Patent is hereby corrected as shown below:

Column 9, line 7 for "6" read -- 16 --.

Column 10, line 33 for "filer" read -- filter --.

Abstract, line 19 for "one a portion" read

-- on a portion --.

Signed and Sealed this

Sixteenth Day of October, 1990

*Attest:*

HARRY F. MANBECK, JR.

*Attesting Officer*  *Commissioner of Patents and Trademarks*